United States Patent
Pausch et al.

(10) Patent No.: US 12,338,856 B2
(45) Date of Patent: Jun. 24, 2025

(54) METHOD FOR PRODUCING A COMPONENT OF A SLIDING BEARING, AND COMPONENT, SLIDING BEARING AND TRANSMISSION OF A WIND TURBINE

(71) Applicant: Schaeffler Technologies AG & Co. KG, Herzogenaurach (DE)

(72) Inventors: Michael Pausch, Dittelbrunn (DE); Christoph Hentschke, Schweinfurt (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 74 days.

(21) Appl. No.: 18/025,004

(22) PCT Filed: Jun. 2, 2021

(86) PCT No.: PCT/DE2021/100476
§ 371 (c)(1),
(2) Date: Mar. 7, 2023

(87) PCT Pub. No.: WO2022/063356
PCT Pub. Date: Mar. 31, 2022

(65) Prior Publication Data
US 2023/0323862 A1    Oct. 12, 2023

(30) Foreign Application Priority Data
Sep. 25, 2020  (DE) .................... 10 2020 125 025.8

(51) Int. Cl.
*F16C 33/14* (2006.01)
*B23K 1/00* (2006.01)
(Continued)

(52) U.S. Cl.
CPC ............ *F16C 33/14* (2013.01); *B23K 1/0008* (2013.01); *F16C 17/02* (2013.01); *F16C 33/046* (2013.01);
(Continued)

(58) Field of Classification Search
CPC ........ F16C 17/02; F16C 33/04; F16C 33/046; F16C 33/06; F16C 33/08; F16C 43/02;
(Continued)

(56) References Cited

U.S. PATENT DOCUMENTS 6,588,934 B2   7/2003  Law
10,436,249 B2  10/2019 Hoelzl
(Continued)

FOREIGN PATENT DOCUMENTS

DE      3728951           3/1989
DE      102005023384 A1   11/2006
(Continued)

OTHER PUBLICATIONS

Translation of DE102012209906 (Year: 2013).*

Primary Examiner — James Pilkington
(74) Attorney, Agent, or Firm — Volpe Koenig

(57) ABSTRACT

A method for producing a component of a sliding bearing includes a) providing a metal bolt with a cylindrical lateral surface and two end faces; b) coating the lateral surface of the bolt with a soldering flux or material; c) providing a metal sheet made of bronze and forming it into a cylindrical sleeve having a longitudinal slot, a first side of the metal sheet forming an inside is coated with a solder material or flux before or after the forming process, the lateral surface of the bolt or the inside of the sleeve having soldering flux; d) sliding the sleeve onto the lateral surface of the bolt; and e) bonding the lateral surface and sleeve soldering. A sliding bearing produced by the method includes the component in (Continued)

a bore of a planetary wheel, and a second side of the metal sheet and planetary wheel are in direct sliding contact.

17 Claims, 4 Drawing Sheets

(51) Int. Cl.
    *F16C 17/02*     (2006.01)
    *F16C 33/04*     (2006.01)
    *F16C 43/02*     (2006.01)

(52) U.S. Cl.
    CPC ........ *F16C 43/02* (2013.01); *F05B 2230/238* (2013.01); *F05B 2240/50* (2013.01); *F05B 2260/40311* (2013.01); *F16C 2226/32* (2013.01); *F16C 2360/31* (2013.01)

(58) Field of Classification Search
    CPC .............. F16C 2226/32; F16C 2226/34; F05B 2260/40311
    See application file for complete search history.

(56) References Cited

U.S. PATENT DOCUMENTS 10,584,748 B2 * 3/2020 Pinnekamp ............ F16C 33/121
11,022,210 B2 * 6/2021 Kontinen ................ F16H 57/08

FOREIGN PATENT DOCUMENTS

| | | |
|---|---|---|
| DE | 102008035288 | 2/2010 |
| DE | 102012209906 | 12/2013 |
| DE | 102017211385 | 1/2019 |
| DE | 102015122787 B4 | 6/2019 |
| DE | 102020125025 | 9/2021 |
| EP | 2383480 | 10/2012 |
| EP | 3431788 | 1/2019 |
| EP | 3396187 | 4/2020 |
| JP | 2002301567 | 10/2002 |
| WO | 2013040001 A1 | 3/2013 |
| WO | 2019178630 A1 | 9/2019 |

\* cited by examiner

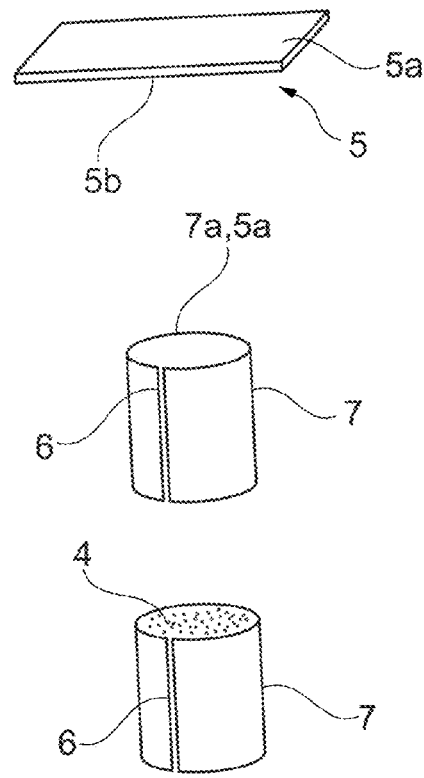
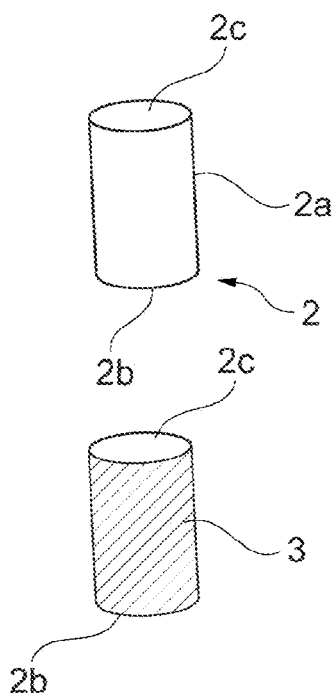
Fig. 1
Fig. 2

METHOD FOR PRODUCING A COMPONENT OF A SLIDING BEARING, AND COMPONENT, SLIDING BEARING AND TRANSMISSION OF A WIND TURBINE

CROSS-REFERENCE TO RELATED APPLICATIONS

This application is the U.S. National Phase of PCT Appln. No. PCT/DE2021/100476, filed Jun. 2, 2021, which claims the benefit of German Patent Appln. No. 102020125025.8, filed Sep. 14, 2020, the entire disclosures of which are incorporated by reference herein.

TECHNICAL FIELD

The disclosure relates to a method for producing a component of a sliding bearing and to such a component. The disclosure further relates to a sliding bearing comprising such a component. Finally, the disclosure relates to a transmission of a wind turbine comprising at least one such sliding bearing.

BACKGROUND

EP 3 396 187 A1 describes a method for producing a component of a sliding bearing in the form of a sliding bearing bush. In this case, a planar supporting metal layer is provided, a sliding layer is arranged thereon and the resulting planar composite material is rolled up in such a way that the supporting layer is arranged radially below the sliding layer. The sliding bearing bush can have a weld seam in an axial direction. The sliding bearing bush forms a planetary wheel pin for supporting a planetary wheel, being mounted in a rotationally fixed manner on an axle, together with this axle. The sliding bearing bush is preferably shrunk onto the axle. The sliding bearing formed, comprising the planetary wheel pin and the planetary wheel, is suitable for use in a wind turbine transmission.

DE 37 28 951 A1 discloses a rolled bush for a sliding bearing, which is made from a strip section. A butt joint occurring in the region of the ends of the rolled strip section pointing towards one another is closed by charge carrier beam welding.

According to DIN1494-1 from June 1983, bushings rolled in this way for sliding bearings have wall thicknesses in the range from 0.75 to 2.5 mm.

SUMMARY

It is the object of the disclosure to significantly reduce the wall thickness of the sliding layer of a component of a sliding bearing and at the same time to minimize the costs for the formation of the sliding layer.

The object is achieved for a method for producing a component of a sliding bearing, comprising the following steps:
  providing a metal bolt with a cylindrical lateral surface and two end faces;
  coating the lateral surface of the bolt with a soldering flux or a solder material;
  providing a metal sheet made of bronze and forming the metal sheet into a cylindrical sleeve having a longitudinal slot, wherein a first side of the metal sheet forming an inside of the sleeve is coated with a solder material or a soldering flux before or after the forming process, either the lateral surface of the bolt or the inside of the sleeve being designed to have the soldering flux;
  sliding the sleeve onto the lateral surface of the bolt;
  integrally bonding the lateral surface and the sleeve by means of a soldering process;
  optionally closing the longitudinal slot of the sleeve, in particular by welding; and
  optionally machining a second side of the metal sheet facing away from the bolt.

The method makes it possible to keep the thickness of the sleeve particularly low and to reduce the manufacturing costs for the component.

If the first side of the metal sheet is coated with a solder material, the soldering flux is applied to the lateral surface of the bolt. If, on the other hand, the solder material is applied to the lateral surface of the stud, the first side of the metal sheet is coated with the soldering flux.

The flat metal sheet is preferably coated before forming into the sleeve, but subsequent coating of the inside of the sleeve after forming is also possible; for example, by thermal spraying of the solder material or spraying on of the soldering flux.

In order to slide the sleeve onto the bolts, these are dimensioned with play in relation to one another in particular in such a way that this is possible without the geometry of the sleeve being deformed.

The bronze metal sheet is preferably formed from a sliding bearing material in the form of a copper-zinc alloy, a copper-tin alloy, a copper-aluminum alloy or mixtures thereof.

The solder material is preferably formed by a hard solder material such as a hard solder containing silver. However, it is also possible to use soft solders as the solder material.

The solder material is preferably applied in a layer thickness in the range of up to 160 µm, in particular in the range of up to 80 µm.

In a preferred embodiment of the method, the solder material is applied by thermal spraying. However, pouring on liquid solder material or screen printing and the like are also possible. Furthermore, the use of a solder foil is possible, which is cut to the required size and inductively heated for application to the metal sheet.

The sleeve is preferably pressed evenly against the bolt on all sides during the soldering process, so that a continuous material connection is formed between the lateral surface of the bolt and the inside of the sleeve during the soldering process. For this purpose, the sleeve can be held on the bolt by at least one clamp surrounding the sleeve. Alternatively, the sleeve together with the bolt can be inserted into a blind hole for soldering, wherein the wall of the blind hole presses the sleeve against the bolt at least in certain areas.

The sleeve is preferably inductively heated during the soldering process in order to liquefy the solder material together with the soldering flux and to form the bonded connection between the inside of the sleeve and the lateral surface of the bolt. As an alternative to inductive heating, heating can also be carried out using an infrared radiator or a gas or oil-fired oven.

The metal sheet preferably has a sheet thickness in the range from 0.1 to 10 mm, in particular in the range from 0.5 to 3 mm. This saves sleeve material and minimizes manufacturing costs.

If mechanically necessary, the longitudinal slot of the sleeve is closed, in particular by welding, in particular laser welding. If the solder material already completely or at least partially fills the longitudinal slot, an additional process for closing the longitudinal slot can also be omitted.

After the optional closing of the longitudinal slot of the sleeve, the second side of the metal sheet, which forms the sliding surface of the component, is preferably mechanically reworked. If the surface of the sleeve already meets the requirements for sliding contact, this can also be omitted.

After the component has been cleaned, it is ready for installation in a sliding bearing.

The bolt is preferably made of steel, in particular of 42CrMoV4 or C60 grade steel. The stud is preferably machined to size and washed prior to coating with soldering flux or solder material.

The object is also achieved by a component of a sliding bearing which is produced using the method according to the disclosure.

Significant cost advantages are achieved by a sliding bearing comprising a component according to the disclosure and a planetary wheel with a bore, wherein the component is accommodated centrally in the bore, and the second side of the metal sheet and the planetary wheel in the region of the bore are arranged in direct sliding contact.

A transmission of a wind turbine, comprising at least one sliding bearing according to the disclosure, also has low production costs and a long service life.

BRIEF DESCRIPTION OF THE DRAWINGS

FIGS. 1 to 7 are intended to explain the disclosure by way of example. In the figures:

FIG. 1 shows a metal foil and its forming into a sleeve with subsequent coating of the inside of the sleeve;

FIG. 2 shows a bolt and the coating of its lateral surface;

FIG. 3 shows another metal foil, its coating and forming into a sleeve;

FIG. 4 shows another bolt and the coating of its lateral surface;

FIG. 5 shows the connection of the bolt and the sleeve to form a component of a sliding bearing;

FIG. 6 shows a longitudinal section through a sliding bearing comprising the component and a planetary wheel; and FIG. 7 shows a transmission for a wind turbine comprising a plurality of sliding bearings.

DETAILED DESCRIPTION

Figure 3:
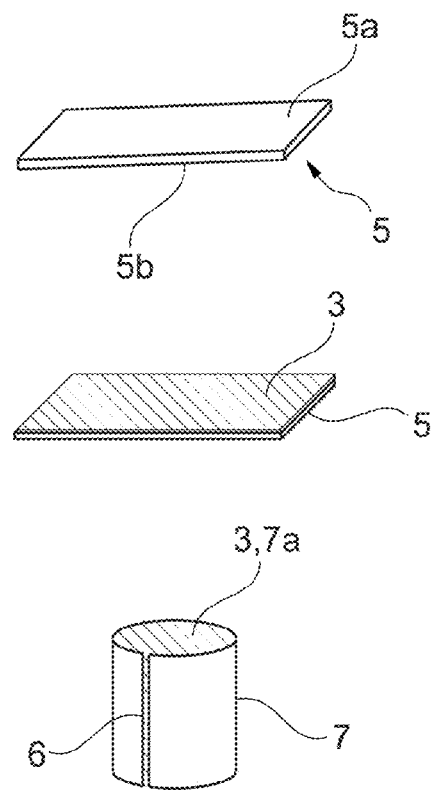

The same reference symbols in the Figures denote the same components.

In the top image, FIG. 1 shows a metal foil 5 made of bronze with a first side 5a and a second side 5b and with a metal sheet thickness of 1 mm. According to the image in the middle, the metal foil 5 is formed into a sleeve 7 by being rolled up, wherein a longitudinal slot 6 is formed. The first side 5a of the metal foil now forms the inside 7a of the sleeve 7. According to the bottom image, the inside 7a of the sleeve 7 is now coated with solder material 4, in particular by thermal spraying.

FIG. 2 shows in the top image a bolt 2 with a lateral surface 2a and two end faces 2b, 2c. The bolt 2 is machined to size and cleaned. The bottom image shows that the lateral surface 2a of the bolt 2 is coated with a soldering flux material 3.

In the top image, FIG. 3 shows a further metal foil 5 made of bronze with a first side 5a and a second side 5b and with a metal sheet thickness of 1 mm. According to the image in the middle, the first side 5a of the metal sheet 5 is coated with a soldering flux 3. According to the bottom image, the metal foil 5 together with the soldering flux 3 is now formed into a sleeve 7 by being rolled up, wherein a longitudinal slot 6 is formed. The first side 5a of the metal foil 5 with the layer of soldering flux 3 now forms the inside 7a of the sleeve 7.

Figure 4:
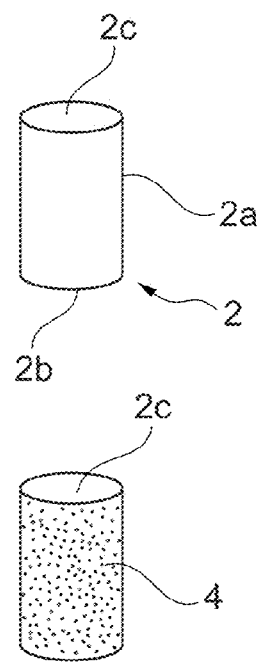

FIG. 4 shows another bolt 2 with a lateral surface 2a and two end faces 2b, 2c. The bolt 2 is machined to size and cleaned. The bottom image shows that the lateral surface 2a of the bolt 2 is coated with a solder material 4, in particular by thermal spraying.

Figure 5:
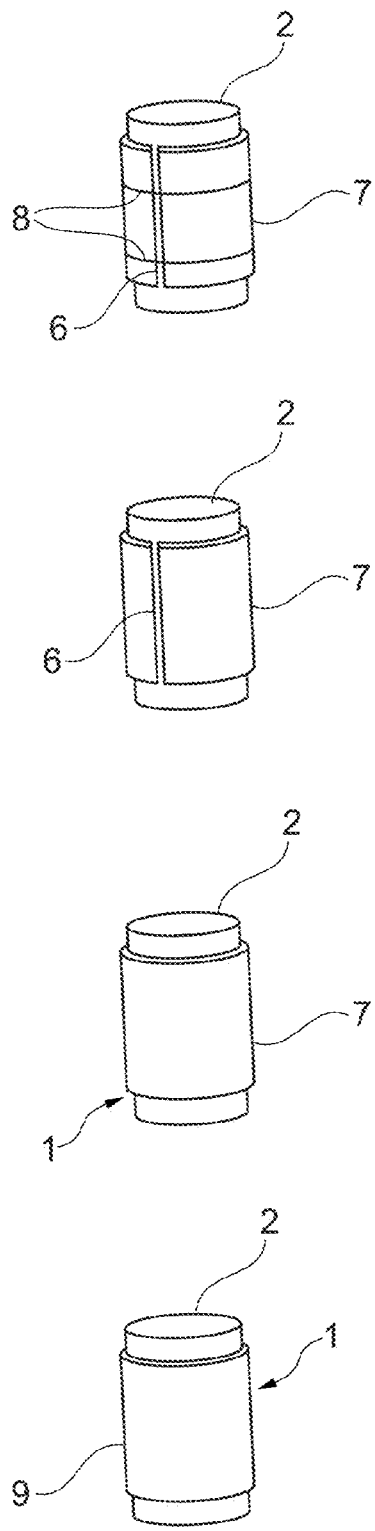
Figure 6:
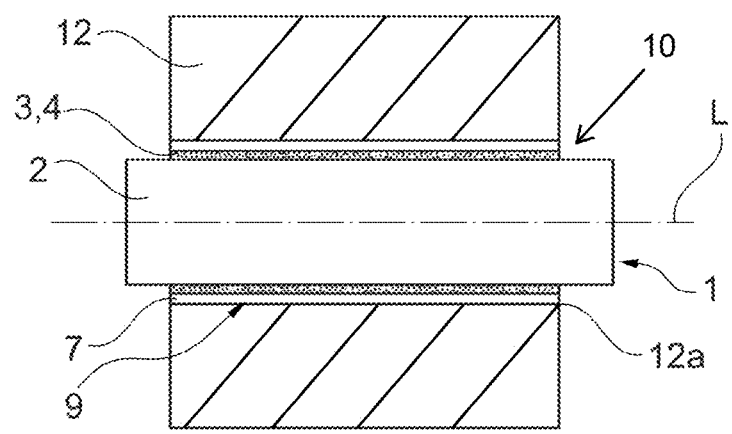

FIG. 5 shows the connection of a bolt 2 with a coated lateral surface 2a according to FIG. 2 and a sleeve 7 according to FIG. 1 or a bolt 2 with a coated lateral surface 2a according to FIG. 4 and a sleeve 7 according to FIG. 3 to form a component 1 of a sliding bearing 10 (see FIG. 6). The top image shows that the sleeve 7 is pushed onto the coated lateral surface of the bolt 2 and is pressed onto the bolt by means of clamps 8 and fixed in position. A soldering process then takes place, during which a material connection between the bolt 2 and the sleeve 7 is formed. The next image shows the bolt 2 with the sleeve 7 soldered on after the soldering process and after removing the clamps 8. A longitudinal slot 6 can be seen in the area of the sleeve 7, which is now closed by laser welding (see next image). If necessary, the sleeve 7 is machined on its side facing away from the bolt 2, which side corresponds to the second side 5b of the metal foil 5. The sliding surface 9 of the component 1 can therefore already be provided after the soldering or after the closing of the longitudinal slot 6 or only after the sleeve 7 has been machined. The component 1 is preferably cleaned and can now be used in a sliding bearing 10 (see FIG. 6).

FIG. 6 shows a schematic longitudinal section through a sliding bearing 10 comprising the component 1 and a planetary wheel 12 with a bore 12a, in which the component 1 is accommodated. You can see the bolt 2, which is firmly bonded to the sleeve 7 via the solder layer 4'. The sleeve 7 has the sliding surface 9 with which the planetary wheel 12 is in sliding contact in the region of the bore 12a. The planetary wheel 12 rotates around the component 1 concentrically to its longitudinal axis L and slides on the sliding layer 9.

Figure 7:
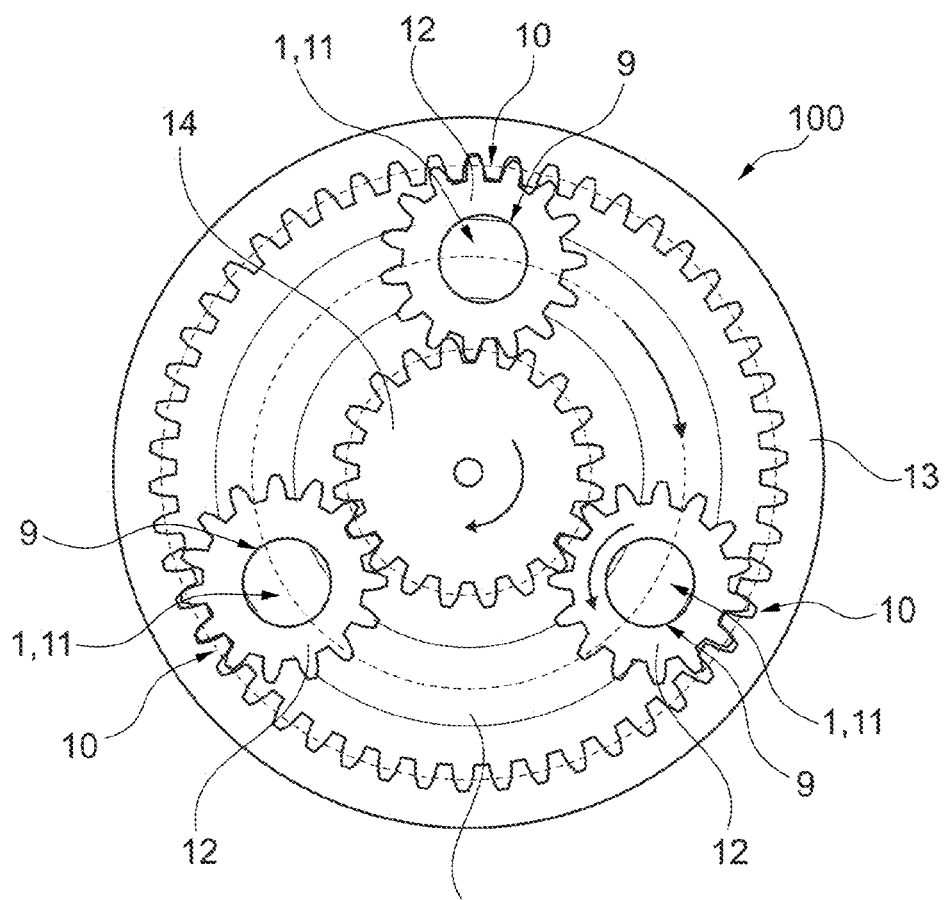

FIG. 7 shows a transmission 100 for a wind turbine comprising three sliding bearings 10. The sliding bearings 10 each comprise a component 1 in the form of a planetary wheel pin 11 and a planetary wheel 12, wherein the planetary wheel 12 and the component 1 or the planetary wheel pin 11 are in sliding contact with one another. Furthermore, a hollow gear 13, a sun gear 14 and a planetary carrier 15 can be seen.

LIST OF REFERENCE SYMBOLS

1 Component
2 Bolt
2a Lateral surface
2b, 2c End face
3 Soldering flux
4 Solder material
4' Solder layer
5 Metal sheet
5a First side
5b Second side
6 Longitudinal slot
7 Sleeve
7a Inside
8 Clamp 9 Sliding surface
10 Sliding bearing
11 Planetary wheel pin
12 Planetary wheel
12a Bore
13 Hollow gear
14 Sun gear
15 Planetary carrier
100 Transmission
L Longitudinal axis

The invention claimed is:

1. A method for producing a component of a sliding bearing, comprising the following steps:
   a) providing a metal bolt with a cylindrical lateral surface and two end faces;
   b) coating the cylindrical lateral surface of the bolt with a soldering flux or a solder material;
   c) providing a metal sheet made of bronze and forming the metal sheet into a cylindrical sleeve having a longitudinal slot, wherein a first side of the metal sheet forming an inside of the sleeve is coated with a solder material or a soldering flux before or after the forming process, either the lateral surface of the bolt or the inside of the sleeve having the soldering flux;
   d) sliding the sleeve onto the lateral surface of the bolt;
   e) integrally bonding the lateral surface and the sleeve by soldering to form a solder layer between the cylindrical lateral surface of the metal bolt and the sleeve; and
   f) closing the longitudinal slot of the sleeve by welding.

2. The method according to claim 1, wherein the solder material comprises silver.

3. The method according to claim 1, wherein the solder material is applied in a layer thickness in a range of up to 160 μm.

4. The method according to claim 1, wherein the solder material is applied by thermal spraying.

5. The method according to claim 1, wherein the sleeve is pressed against the bolt during the soldering.

6. The method according to claim 1, wherein the sleeve is inductively heated during the soldering.

7. The method according to claim 1, wherein the metal sheet has a sheet thickness in a range of from 0.1 to 10 mm.

8. The method according to claim 1, further comprising machining a second side of the metal sheet facing away from the bolt.

9. A component of a sliding bearing produced by the method according to claim 1.

10. An assembly, comprising:
    a sliding bearing comprising:
       a component including a metal bolt with a cylindrical lateral surface and two end faces, and
       a cylindrical sleeve formed of a metal sheet made of bronze and having a longitudinal slot located on the metal bolt,
       wherein one of a first side of the metal sheet forming an inside of the sleeve or the cylindrical lateral surface is coated with a solder material and the other of the first side of the metal sheet forming an inside of the sleeve or the cylindrical lateral surface is coated with a soldering flux prior to sliding the cylindrical lateral sleeve onto the bolt and integrally bonding the cylindrical lateral surface and the sleeve by soldering to form a solder layer between the cylindrical lateral surface of the metal bolt and the sleeve, and wherein the longitudinal slot of the sleeve is closed by welding;
    a planetary wheel with a bore, wherein the component is accommodated centrally in the bore; and
    a second side of the metal sheet and the planetary wheel in a region of the bore are arranged in direct sliding contact.

11. The assembly of claim 10, wherein the second side of the metal sheet facing away from the bolt is machined.

12. The assembly of claim 10, wherein the solder material comprises silver.

13. The assembly of claim 10, wherein the solder material has a layer thickness in a range of up to 160 μm.

14. The assembly of claim 10, wherein the metal sheet has a sheet thickness in a range of from 0.1 to 10 mm.

15. The assembly of claim 10, wherein the longitudinal slot of the sleeve is closed by laser welding.

16. The assembly of claim 10, wherein the longitudinal slot extends parallel to a central axis of the cylindrical sleeve.

17. An assembly, comprising:
    a sliding bearing comprising:
       a component including a metal bolt with a cylindrical lateral surface and two end faces; and
       a cylindrical sleeve formed of a metal sheet made of bronze and having a longitudinal slot located on the metal bolt, wherein the longitudinal slot extends parallel to a central axis of the cylindrical sleeve;
       wherein one of a first side of the metal sheet forming an inside of the sleeve or the cylindrical lateral surface is coated with a solder material and the other of the first side of the metal sheet forming an inside of the sleeve or the cylindrical lateral surface is coated with a soldering flux prior to sliding the cylindrical lateral sleeve onto the bolt and integrally bonding the cylindrical lateral surface and the sleeve by soldering to form a solder layer between the cylindrical lateral surface of the metal bolt and the sleeve;
    a planetary wheel with a bore, wherein the component is accommodated centrally in the bore; and
    a second side of the metal sheet and the planetary wheel in a region of the bore are arranged in direct sliding contact.

* * * * *